H. N. STROECKER.
HANGER.
APPLICATION FILED OCT. 7, 1915.

1,178,965.

Patented Apr. 11, 1916.

Henry N. Stroecker
Inventor

UNITED STATES PATENT OFFICE.

HENRY N. STROECKER, OF CHICAGO, ILLINOIS.

HANGER.

1,178,965.  Specification of Letters Patent.  Patented Apr. 11, 1916.

Application filed October 7, 1915.  Serial No. 54,661.

*To all whom it may concern:*

Be it known that I, HENRY N. STROECKER, a citizen of the United States, residing at Chicago, in the county of Cook and State of Illinois, have invented certain new and useful Improvements in Hangers, of which the following is a specification.

This invention relates to hooks employed by painters for supporting paint pots on a ladder, and its object is to provide a novel and improved hook having means whereby the pot or pail is firmly supported and prevented from swinging.

The object stated is attained by means of a combination and arrangement of parts to be hereinafter described and claimed, reference being had to the accompanying drawing, in which—

Figure 1:
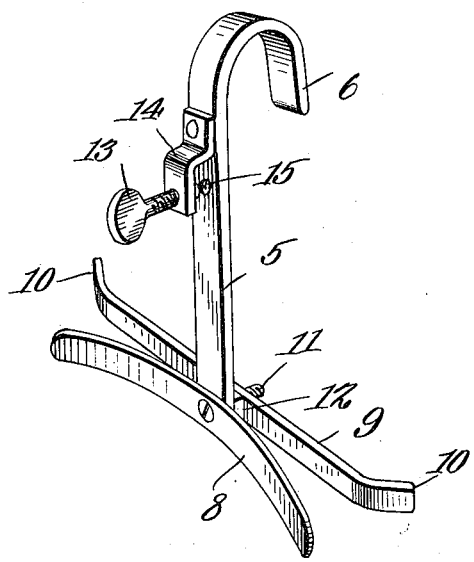
Figure 2:
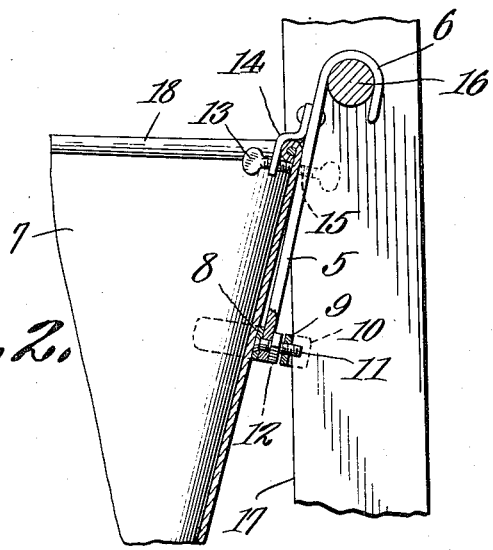

Figure 1 is a perspective view of the hook, and Fig. 2 is a sectional view showing its application.

Referring specifically to the drawing, 5 denotes the shank, and 6 the bill of a hook of the usual type. The bill is on one end of the shank, and on the other end of the latter are means for steadying the pot or pail 7 supported by the hook, said means comprising two cross bars 8 and 9, respectively, projecting from opposite sides of the hook shank. The cross bar 8 is bowed outward from the cross bar 9 and is designed to extend partly around the outside of the pot 7. The cross bar 9 is straight except at its ends, where it has lateral bends 10.

The cross bars 8 and 9 are secured to the hook shank 5 by a bolt 11 passing through said parts. The head of this bolt is countersunk in the cross bar 8, and the cross bar 9 has a threaded aperture into which the bolt is secured. The aperture in the hook shank through which the bolt passes is not threaded. A nut 12 is screwed on the bolt, the hook shank being located between the nut and the cross bar 8. Adjacent to the bill 6, the hook shank 5 carries a clamp for holding the pot 7. This clamp comprises a screw 13 threaded through a bracket member 14 carried by the back of the hook shank and spaced therefrom. In line with the screw, the hook shank has a threaded aperture 15.

In use, the bill 6 of the hook is slipped over the desired rung 16 of the ladder, and one of the ends 10 of the cross bar 9 is allowed to rest on the front edge of the corresponding ladder side bar 17. The pot 7 is placed against the cross bar 8 with its rim seating under the bracket member 14. The screw 13 is now advanced to engage the inside of the pot beneath the top rim 18 thereof, whereby the pot is securely clamped to the hook, and the latter holds the pot close to the ladder. The hook may be placed adjacent to either side rail of the ladder and the corresponding end of the cross bar 9 engages said rail. If the pot has an outward marginal rim, the screw may be applied from the opposite side, as shown dotted in Fig. 2, the aperture 15 being provided for this purpose.

The attaching means of the cross bar 9 enables the spacing of the pot from the ladder to be varied by backing said cross bar on the bolt 11. The cross bar 8 and the hook shank 5 are not affected by this adjustment as they are rigidly secured on the bolt by the nut 12. Another advantage of this connection is that the cross bars 8 and 9 may be removed from the hook shank in order that the device may be placed in a small and compact form for convenience in shipment.

I claim:—

1. A hanger comprising a shank having a hook bill at one end, cross bars carried by the other end of the shank, one of said bars being bowed outward from the other bar, and a clamping screw carried by the shank adjacent to the hook bill.

2. A hanger comprising a shank having a hook bill at one end, cross bars carried by the other end of the shank, one of said bars having lateral bends at its ends, and the other bar being bowed outward from said bar.

3. A hanger comprising a shank having a hook bill at one end, a bowed cross bar carried by the other end of the shank, and a clamping screw carried by the shank adjacent to the hook bill.

In testimony whereof I affix my signature.

HENRY N. STROECKER.